Aug. 5, 1969 K. E. THORVALDSSON 3,460,129

FREQUENCY DIVIDER

Filed Feb. 24, 1965 5 Sheets-Sheet 1

INVENTOR.
KURT EGRON THORVALDSSON
BY Kane and Nydick
ATTORNEYS

Aug. 5, 1969 K. E. THORVALDSSON 3,460,129

FREQUENCY DIVIDER

Filed Feb. 24, 1965 5 Sheets-Sheet 2

INVENTOR.
KURT EGRON THORVALDSSON
BY Hane and Nydick
ATTORNEYS

Aug. 5, 1969 K. E. THORVALDSSON 3,460,129

FREQUENCY DIVIDER

Filed Feb. 24, 1965 5 Sheets-Sheet 3

INVENTOR.
KURT EGRON THORVALDSSON
BY Hane and Nydick
ATTORNEYS

Aug. 5, 1969 K. E. THORVALDSSON 3,460,129

FREQUENCY DIVIDER

Filed Feb. 24, 1965 5 Sheets-Sheet 4

INVENTOR.
KURT EGRON THORVALDSSON

BY Hane and Nydick

ATTORNEYS

Aug. 5, 1969 K. E. THORVALDSSON 3,460,129

FREQUENCY DIVIDER

Filed Feb. 24, 1965 5 Sheets-Sheet 5

INVENTOR.
KURT EGRON THORVALDSSON

BY Hane and Nydick

ATTORNEYS

United States Patent Office 3,460,129
Patented Aug. 5, 1969

3,460,129

FREQUENCY DIVIDER

Kurt Egron Thorvaldsson, Goteborg, Sweden, assignor to Telefonaktiebolaget L M Ericsson, Stockholm, Sweden, a corporation of Sweden Filed Feb. 24, 1965, Ser. No. 434,760
Claims priority, application Sweden, Mar. 9, 1964, 2,917/64
Int. Cl. H03k 13/02
U.S. Cl. 340—347 2 Claims

ABSTRACT OF THE DISCLOSURE

A frequency divider for converting an *n* position binary number to a train of pulses having a frequency proportional to the binary number includes *n* two-input and-circuits. One input of each and-circuit receives the signal representing the value of one of the binary positions of the number respectively. The other input of each and-circuit receives one of *n* trains of pulses which are phase-shifted with respect to each other so that signals are transmitted from the and-circuits in a cyclic sense. The outputs of the and-circuits are connected in parallel via or-circuits to the inputs of a cascaded chain of *n* binary counter stages. In addition, the frequency divider is shown in various embodiments to perform binary multiplication and division.

The present invention relates to a frequency divider for converting a binary number into a train of square pulses the frequency of which pulses is proportional to said binary number.

The purpose of the invention is to provide an operator for carrying out elementary calculating operations such as addition, subtraction, multiplication, division etc. which operator upon a calculation necessitates only a few electrical operations compared with earlier solutions.

The frequency divider according to the invention is substantially characterized thereby that it comprises and-circuits the number of which corresponds to the number of digit positions in the binary number, one input of which and-circuits is connected to a register stage that corresponds to a digit position in a register in which the binary number will be recorded, and the second input of which is connected to a pulse source that generates in cyclic sequence a pulse on said inputs so that on the outputs of those and-circuits which belong to a digit position having a recorded binary digit "1," output signals will be obtained in cyclic sequence, the frequency divider containing a binary counter in which each stage corresponds to a digit position in the register and is connected to the output of respective and-circuit and with the output of the preceding stage, which connections pass through an or-circuit belonging to each of the stages with the exception of the stage belonging to the lowest digit position which stage is directly connected to its and-circuit so that the stages of the binary counter are operated as well by the pulses obtained from the preceding stages as by the pulses obtained from the and-circuits belonging to the respective digit position.

According to a modification of the invention the binary counter of the frequency divider is replaced by an or-circuit to the inputs of which are connected the outputs of all and-circuits belonging to respective digit positions which or-circuit produces through its output a signal during the whole time one of said and-circuits produces an output signal.

Figure 1:
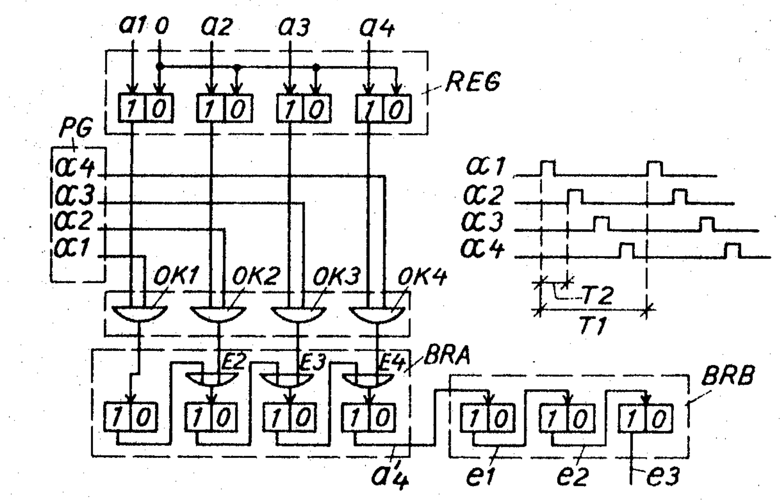
Figure 2:
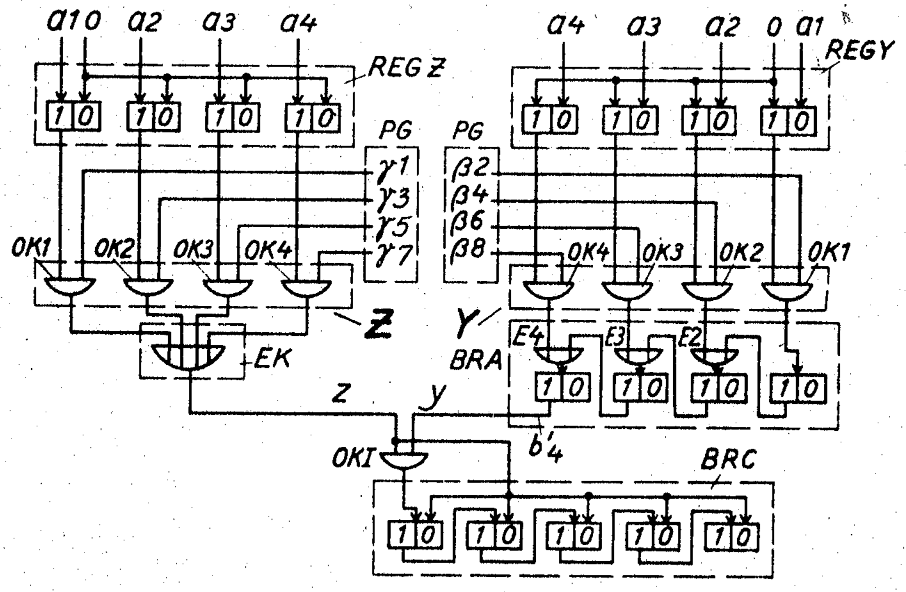
Figure 3:
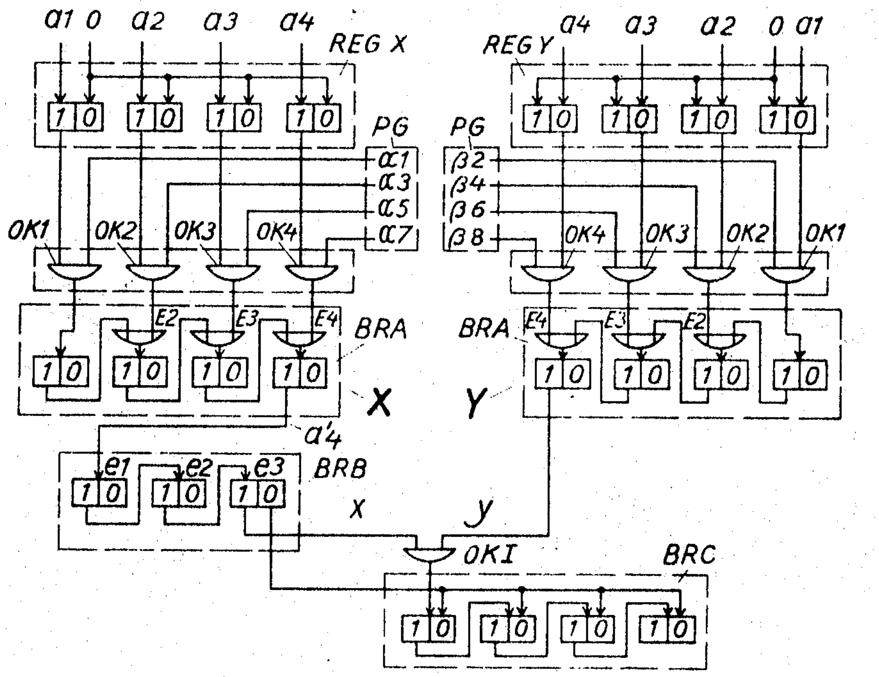
Figure 4A:
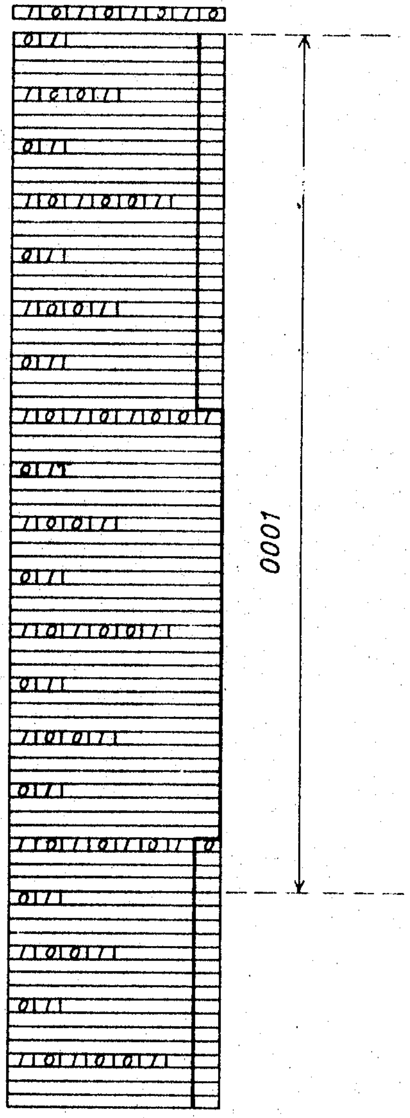
Figure 4B:
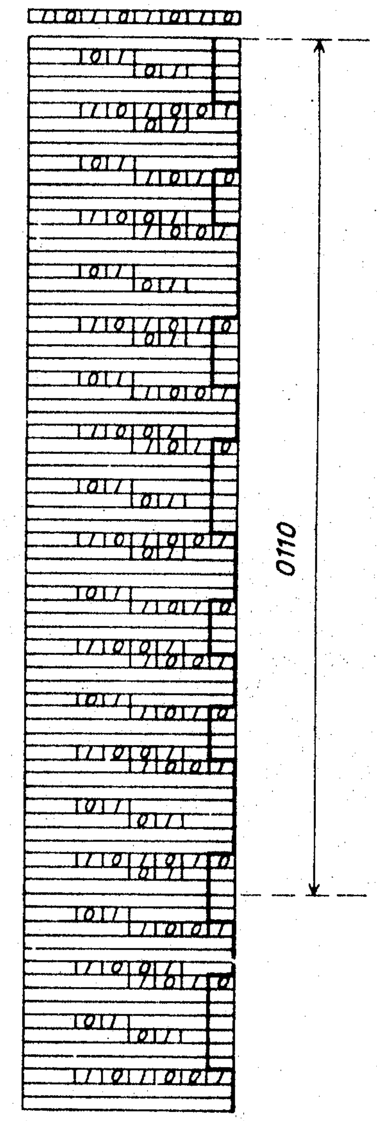
Figure 5:
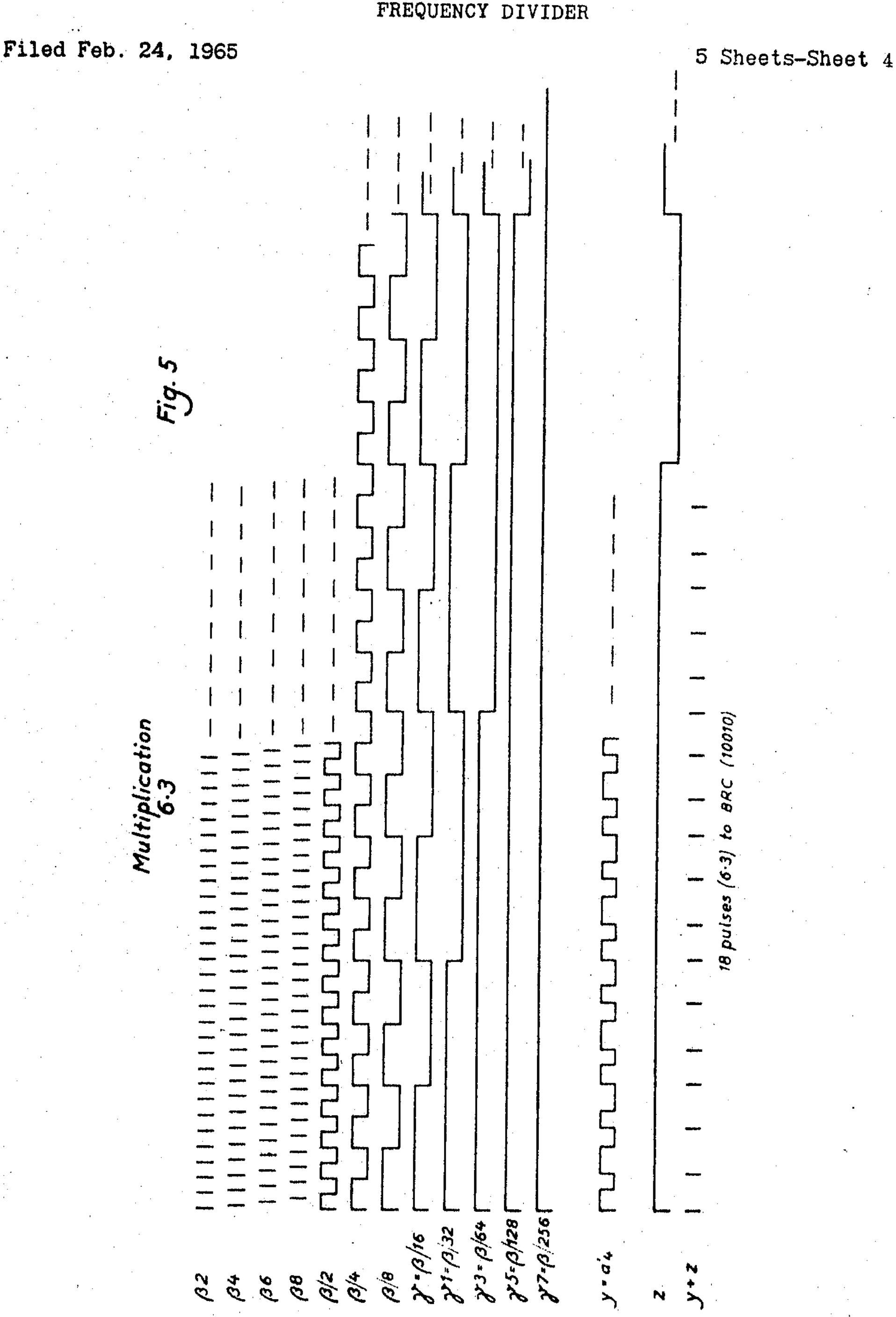
Figure 6:
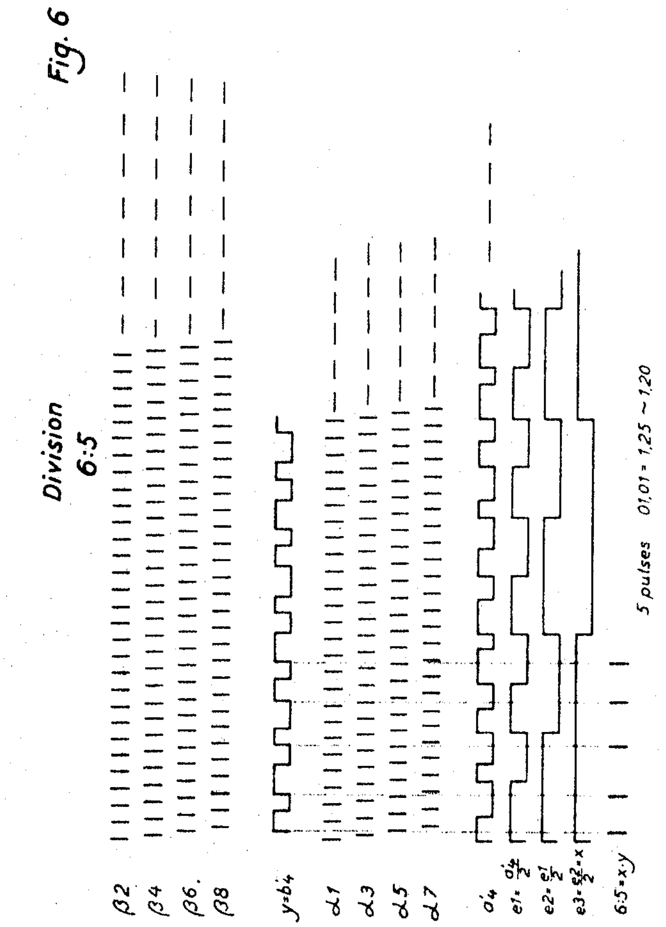

The invention will be explained more closely herebelow by means of some embodiments with reference to the enclosed drawing in which FIG. 1 shows the fundamental design of a frequency divider according to the invention, FIG. 2 shows a circuit arrangement consisting of two frequency dividers according to the invention, intended to carry out multiplication, FIG. 3 shows a circuit arrangement consisting of two frequency dividers according to the invention, intended for division, FIGS. 4*a* and 4*b* show the output signal of the frequency divider when the digit recorded is 1 and 6 respectively, FIG. 5 shows the time process of the pulses when carrying out a multiplication and FIG. 6 shows the time process of the pulses when carrying out a division.

FIG. 1 shows a frequency divider built up according to the fundamental idea of the invention. By REG is indicated a register in which an arbitrary number may be recorded in binary form. The register comprises for this purpose a number of bistable circuits corresponding to the number of digit positions *a*1–*a*4. When a binary number is recorded in the register, a signal will be obtained from the outputs of those bistable circuits the condition of which corresponds to the digit "1" in the respective digit position. Said outputs are connected to one of the inputs of each of a number of and-circuits OK1–OK4. The second input of the and-circuits is connected to a pulse source PG which for example consists of a delay line and which supplies to respective and-circuits, pulse trains $\alpha 1$–$\alpha 4$. These pulses have the same repetition frequence $1/T_1$ but they are phase shifted relatively to each other with a time period $T_2$ obtained by dividing the period $T_1$ of the pulses by the number of the pulse trains. By BRA is indicated a binary counter which contains bistable circuits the number of which corresponds to the number of digit positions, each bistable circuit obtaining a switching pulse from the preceding bistable circuit in the chain. Each of the stages will furthermore obtain a switching pulse in the case the and-circuit belonging to the respective digit position becomes operative when receiving the pulse, i.e., if the digit position contains the digit "1." If for example the number recorded in the register is 6, in binary form 0110, there will arise on the output of the binary counter BRA 6 times fewer changes of condition than in the case the recorded binary number is 0001. This is indicated in the tables in FIGS. 4*a* and 4*b* which show the changes of condition in the counting chain BRA and on its output during a number of pulse periods. As is apparent there will arise a dissymmetry in the signal obtained from the binary counter BRA and in order to decrease the symmetry fault it is possible to connect to the output of the binary counter BRA another binary counter BRB that for each of its positions will divide the symmetry fault by two. By means of this second binary counter it is possible to obtain decimals in the numbers counted as will be explained in connection with the embodiments.

FIG. 2 shows an example of a circuit arrangement for carrying out a multiplication by means of two frequency dividers according to the invention. The circuit arrangement consists of two frequency dividers one of which Z, belongs to the multiplicator and the second Y, belongs to the multiplicand. The frequency divider of the multiplicand corresponds to the circuit shown in FIG. 1 while the frequency divider of the multiplicator differs thereby that the binary counter BRA has been replaced by an or-circuit EK the input of which is connected to the outputs of the and-circuits OK1–OK4. The output *z* of said or-circuit forms one input of an and-circuit OK1 the second input of which is connected to the output *y* of the binary counter BRA of the multiplicand. The output of the and-circuit OK1 is connected to the input of a binary counter BRC which is stepped forward each time a signal appears on the wires *z* and *y* simultaneously and which indicates the result of the calculation. The pulse trains $\beta 2$–$\beta 8$ fed to the frequency divider of the multiplicand have the same repetition frequency and are phase shifted relatively to each other in the same manner as appears from FIG. 1. The pulse trains $\gamma 1$–$\gamma 7$ are on the other hand adapted in such a way that the frequency of the pulse train $\gamma 1$ belonging to the lowest digit position is the half of the lowest frequency that may be obtained by the frequency divider of the multiplicand, thus $\frac{1}{2} \times \frac{1}{16} = \frac{1}{32}$ of the frequency of the pulses $\beta$. The frequency of $\gamma 3$ is half of the frequency of $\gamma 1$, the frequency of $\gamma 5$ is half of the frequency of $\gamma 3$ and the frequency of $\gamma 7$ is half of the frequency of $\gamma 5$. The frequency of the pulses $\gamma 7$ is $\frac{1}{256}$ part of the frequency of the $\beta$-pulses.

Said relation appears from FIG. 5 which shows the different frequencies and also shows a simple example of a multiplication where the multiplicand is 6 and the multiplicator is 3. It is easy to see that if the register REGY of the multiplicand is set correspondingly to the digit 6 in binary form, the signal obtained from the output $y$ of the binary counter BRA will have a frequency which is $\frac{1}{6}$ of the frequency obtained when the recorded binary digit is 1 as it has been already explained in connection with FIGS. 4$a$ and 4$b$. When considering the frequency divider Z of the multiplicator it appears that also there the frequency of the output signal from the or-circuit EK will be dependent on the number recorded in the register in such a way that a signal is obtained only from the outputs of those digit positions in which "1" is recorded. Thus a signal will be obtained on the output as long as one of the outputs of the four and-circuits produces a signal. According to the example the number recorded is 3, in binary form 0011 (observe that in the register REGZ the lowest digit position is located farthest to the left) which implies that the first and the second position are 1-positioned while the third and the fourth are 0-positioned. In FIG. 5 are shown the time processes of both these signals. As it appears a signal will be obtained on the output $z$ the whole time a signal is obtained from the and-circuit OK1 and also when this signal ceases and the signal appears on the output of the and-circuit OK2. If now the signal appearing on the wire $z$ is compared with the signal appearing on the wire $y$ it is easy to see that 18 pulses will occur on the wire $y$ during the time the signal is remaining on the wire $z$. The and-circuit OK1 supplies 18 pulses to the binary counter BRC so that this will be set in correspondence to the binary number 18, i.e. 10010. When the pulse through the line $z$ ceases, the binary counter BRC will be set to 0 and the process will start again.

FIG. 3 shows a circuit arrangement for carrying out a division. The circuit of the dividend as well as of the divisor corresponds to the circuit shown in FIG. 1. The output $x$ of the latter is connected to an and-circuit OK1 counter BRB for decreasing the symmetry fault and the output x of the latter is connected to an and-circuit OK1 together with the output $y$ from the circuit Y of the dividend. The output of the and-circuit OK1 is connected to a binary counter BRC which corresponds to the counter shown in FIG. 2 and indicates the result of calculation in the form of a binary number. FIG. 6 shows an example of a simple division where 6 is to be divided by 5. The circuit Y of the dividend is set in the same manner as in the example according to FIG. 2 upon which on the output $y$ the same signal is obtained as upon the multiplication according to FIG. 5. In this case the pulses $\alpha$ fed to the circuit X of the divisor have the same repetition frequency as the pulses $\beta$. A corresponding frequency division will thus be obtained as in the circuit of the dividend in correspondence to the number 5, or in binary form 0101, recorded in the register REGY of the circuit of the divisor and on the output $a_4'$ of the binary counter BRA a signal will be obtained the frequency of which is $\frac{1}{5}$ of the frequency of the basic pulse $\alpha$. The binary counting chain BRB carries out a division by 2 for each stage. In the diagram of FIG. 6 the signal is shown that is obtained through the wire $x$, and it appears that with the selected stage number of the binary counter BRB 5 pulses will occur on the wire $y$ during the time the signal is remaining on the wire $x$. The binary counter BRC will in the same manner as in the example of multiplication count the number of received pulses and record the digit 5 in binary form, i.e. 0101. With regard to the fact that the counting chain BRB has increased the duration of the signal on the wire $x$ four times, i.e. by 2 decimals, a corresponding decrease must be carried out in the result of calculation. Thus 01, 01, i.e. 1, 25, will be obtained instead of 1, 20. If the number of stages in the binary counter BRB is increased, more binary digits would be obtained and the result obtained becomes more exact.

I claim:

1. Apparatus for multiplying a binary number multiplicand by a binary-number multiplier comprising: a first frequency divider comprising $n$ two-input and-circuits, $n$ being equal to the number of binary positions in said multiplicand, one input of each and-circuit receiving the binary digit signal of a different one of the binary position of the multiplicand respectively, a first source of $n$ phase-displaced pulses, the second input of each and-circuit receiving a different one of the phase-displaced pulses respectively, $n$ binary counter stages, each having an input and an output, $n-1$ two-input or-circuits, means for connecting the output of all but one of the binary counter stages to a first input of one of said or-circuits, respectively, the second input of each or-circuit being connected to an output of all but one of said and-circuits respectively, the output of said one and-circuit being connected to the input of the binary counter stage not connected to an output of an or-circuit; a second frequency divider comprising $m$ two-input and-circuits, $m$ being equal to the number of binary positions in said multiplier, one input of each of said $m$ and-circuits receiving the binary digit signal of a different one of the binary positions of the multiplier respectively, a source of $m$ phase-displaced pulses, the second input of each of said $m$ and-circuits receiving a different one of said $m$ phase-displaced pulses respectively, and an $m$-input or-circuit, each of the inputs of said $m$-input or-circuit being connected to the output of one of said $m$ and-circuits respectively; a cascaded chain of binary counter stages for storing the product of the multiplication, said chain having an input; and further a two-input and-circuit; means for connecting the first input of said further and-circuit to the output of said $m$-input or-circuit, means for connecting the second input of said further and-circuit to the output of the binary counter stage of said first frequency divider which is not connected to an or-circuit; the pulse sources of said first and second frequency dividers being arranged in such a way that the pulse repetition frequency of the pulses fed to the $n$ and-circuits of the first frequency divider associated with the multiplicand is the same for each of the binary positions while the frequency of the pulses fed to the $m$ and-circuits of the second frequency divider associated with the multiplier decreases by one half for each binary position, starting from the least significant position which has a pulse frequency that is one half of the lowest frequency that the first frequency divider can produce.

2. Apparatus for dividing a binary number dividend by a binary number divisor comprising: a first frequency divider comprising $n$ two-input and-circuits, $n$ being equal to the number of binary positions in said dividend, one input of each and-circuit receiving the binary digit signal of a different one of the binary position of the dividend respectively, a first source of $n$ phase-displaced pulses, the second input of each and-circuit receiving a different one of the phase-displaced pulses respectively, $n$ binary counter stages, each having an input and an output, $n-1$ two-input or-circuits, means for connecting the output of all but one of the binary counter stages to a first input of one of said or-circuits, respectively, the second input of each or-circuit being connected to an output of all but one of said and-circuits respectively, the output of said one and-circuit being connected to the input of the binary counter stage not connected to an output of an or-circuit;

a second frequency divider comprising $m$ two-input and-circuits, $m$ being equal to the number of binary positions in said divisor, one input of each of said $m$ and-circuits receiving the binary digit signal of a different one of the binary positions of the divisor respectively, a source of $m$ phase-displaced pulses, the second input of each of said $m$ and-circuits receiving a different one of said $m$ phase-displaced pulses respectively, and an $m$-input or-circuit, each of the inputs of said $m$-input or-circuit being connected to the output of one of said $m$ and-circuits respectively; a cascaded chain of binary counter stages for storing the quotient of the division, said chain having an input; and further a two-input and-circuit; means for connecting the first input of said further and-circuit to the output of said $m$-input or-circuit, means for connecting the second input of said further and-circuit to the output of the binary counter stage of said first frequency divider which is not connected to an or-circuit; the pulse repetition frequency of the sources of pulses of said first and second frequency dividers being equal whereby the number of pulses transmitted to said cascaded chain of binary counter stages corresponds to the quotient.

References Cited

UNITED STATES PATENTS

| | | | |
|---|---|---|---|
| 2,907,021 | 9/1959 | Woods | 340—347.1 |
| 2,913,179 | 11/1959 | Gordon | 235—150.3 |
| 3,040,983 | 6/1962 | Bigelow | 235—150.3 |
| 3,064,248 | 11/1962 | Glick | 340—347.1 |
| 3,064,894 | 11/1962 | Campbell | 235—155 |
| 3,230,353 | 1/1966 | Greene et al. | 235—150.3 |

OTHER REFERENCES

Mergler: Binary Rate Multipliers with Smooth Outputs, Control Engineering, p. 73, March 1966.

MAYNARD R. WILBUR, Primary Examiner

MICHAEL K. WOLENSKY, Assistant Examiner

U.S. Cl. X.R.

235—150, 164; 328—39